(12) United States Patent
Hamaguchi et al.

(10) Patent No.: US 6,822,818 B2
(45) Date of Patent: Nov. 23, 2004

(54) MAGNETIC HARD DISK DRIVE

(75) Inventors: Takehiko Hamaguchi, Fuchu (JP); Kyo Akagi, Fuchu (JP); Hisashi Takano, Kodaira (JP); Takayuki Ichihara, Tokyo (JP)

(73) Assignee: Hitachi, LTD, Tokyo (JP)

( * ) Notice: Subject to any disclaimer, the term of this patent is extended or adjusted under 35 U.S.C. 154(b) by 518 days.

(21) Appl. No.: 09/919,915

(22) Filed: Aug. 2, 2001

(65) Prior Publication Data

US 2002/0060871 A1 May 23, 2002

(30) Foreign Application Priority Data

Nov. 20, 2000 (JP) ........................................ 2000-357616

(51) Int. Cl.[7] ................................................. G11B 5/09
(52) U.S. Cl. ....................... 360/48; 360/75; 360/77.08
(58) Field of Search ............................... 360/77.08, 75, 360/48, 78.14

(56) References Cited

U.S. PATENT DOCUMENTS 4,967,293 A * 10/1990 Aruga et al. ............. 360/78.12
5,073,834 A * 12/1991 Best et al. ................ 360/77.08
6,388,829 B1 * 5/2002 Nazarian .................... 360/48
6,469,853 B1 * 10/2002 Satoh ......................... 360/48

FOREIGN PATENT DOCUMENTS

JP          10-097770         9/1996

* cited by examiner

Primary Examiner—David Hudspeth
Assistant Examiner—Dan I Davidson
(74) Attorney, Agent, or Firm—Reed Smith LLP; Stanley P. Fisher, Esq.; Juan Carlos A. Marquez, Esq.

(57) ABSTRACT

A hard disk drive and magnetic medium including a servo area, a data area divided into a plurality of sector blocks and at least one micro-servo area disposed between two sector blocks. There may be a micro-servo area immediately preceding each of the plurality of sector blocks. The micro-servo areas include an address mark and a track parity check code that allow the detection of an external shock that causes the recording (write) head to skip to an adjacent track in the hard disk medium. The micro-servo area is smaller than the servo areas, and various numbers of different track parity check codes can be used for different resolution of shock detection. An acceleration sensor may also be provided to detect larger external shocks. By detecting various external shocks with improved accuracy, and aborting the recording operation of data if an external shock is detected, the corruption of data in adjacent tracks is substantially reduced to improve disk drive performance.

20 Claims, 11 Drawing Sheets

MAGNETIC HARD DISK DRIVE

PRIORITY TO FOREIGN APPLICATIONS

This application claims priority to Japanese Patent Application No. P2000-357616.

BACKGROUND OF THE INVENTION

1. Field of the Invention

The present invention relates to an information storage system including a magnetic head and a magnetic recording medium and, more particularly, relates to a portable magnetic hard disk drive having an improved shock resistance performance particularly during operation.

2. Description of the Background

The magnetic hard disk used in current magnetic hard disk drives typically includes a structure in which servo areas and data areas divided into a plurality of sector blocks are formed on concentrically formed tracks as shown in FIG. 6. In each of the servo areas, a specific bit pattern referred to as a servo pattern is recorded. Accurate information about the positioning of the magnetic head is performed by obtaining a head position signal from the servo pattern. The servo pattern typically includes an ISG (Initial Signal Gain) field, an SVAM (Servo Address Mark) field, a Gray code field, a burst field, a padding field, and other information as generally shown in FIG. 7.

When an external shock is applied to a magnetic hard disk drive during a recording operation of a magnetic head, the magnetic head may be displaced in the direction of track width. When this displacement occurs, the recording operation is preferably aborted so that adjacent tracks are not overwritten. In JP-A-97770/1998, there is disclosed a technology where a parity bit is provided at the boundary between adjacent tracks in a servo area in order to detect in which direction a head has moved (either an inward or outward radial direction of the disk) upon the occurrence of a positional displacement of the head. Further, for a compact magnetic hard disk drive, there may be a continuous monitoring for an external shock in which the compact magnetic hard disk drive further includes an acceleration sensor as described below.

SUMMARY OF THE INVENTION

A magnetic head typically obtains position information by detecting a head position signal from a servo area while moving over a track. However, only about from 50 to 100 servo areas are provided per circumference of a disk. Therefore, only a minimal amount of servo information can be obtained. Accordingly, even if a positional displacement of the head occurs between servo areas, the head may not accurately detect the occurrence of the positional displacement thereof.

FIGS. 9(a) to 9(c) illustrate a manner in which the adjacent track is destroyed due to the positional displacement of the head. FIG. 9(a) shows the state in which the recording operation has been normally performed. On the other hand, FIGS. 9(b) and 9(c) show two examples of a state in which the data of the adjacent track is destroyed due to the positional displacement of the head. The cross-hatched region denotes the track (#2) to which the recording operation has been performed.

Referring now to FIG. 9(b), the positional displacement of the head occurs during the recording operation on the data area (sector block #2), and the movement of the head is detected at the next servo area (#2). Upon this detection, the recording operation is preferably aborted. However, the head has already moved well into the undetectable section, and the data in the data area (sector block #4) of the adjacent track (#3) has been overwritten and corrupted.

FIG. 9(c) shows a state in which the recording operation has been performed at the position extending across a boundary between the adjacent tracks to form a data sector extending across a boundary between the track (#2) and the track (#3). In the state of FIG. 9(c), even if the data can be normally reproduced, a user may not be able to distinguish which data is the proper data written in final update. Hence, incorrect or unreliable information may exist in sector (#4) of tracks (#2) and (#3).

The number of servo areas per circumference of a disk may be increased in order to reduce the interval at which the head position is detected (thereby decreasing the time it takes to detect a position fault). However, the size of the data areas will undesirably decrease with the number of servo areas increases.

Further, in some applications an acceleration sensor has been employed to detect and compensate for positional errors in a hard disk drive. However, it may be difficult to estimate the relative positions of the head and the disk from the acceleration sensor when continuous vibrations or similar disturbances are applied to the disk.

For at least the reasons described above, the function of detecting the positional displacement of the head of a conventional magnetic hard disk drive does not have the desired accuracy such that the recording operation can be reliably aborted upon the occurrence of positional displacement. Under such circumstances, particularly for a magnetic hard disk drive with an increased data track density, a need may exist to provide a technology in which the shock resistance performance during operation is improved by preventing the fatal error of overwriting of the adjacent tracks to enhance the reliability of the disk.

In a magnetic hard disk drive according to at least one preferred embodiment of the present invention, an area in which track position information having a smaller data size than that of the recorded servo information is provided immediately at the front of each sector block in order to address one or more of the foregoing limitations of the conventional magnetic disks. In the present invention, the area in which track position information having a smaller data size than that of servo information is recorded is referred to as a "micro-servo area." The track position information preferably has a smaller data size than that of the servo information so as not to require a compression in the data area.

The micro-servo area may also be formed with a smaller area than that of the servo area. In preferred embodiments, the track position information recorded in the micro-servo area are set to be mutually different at least between adjacent tracks. The track position information may include, for example, a parity code indicating whether the track number is odd or even. Consequently, even if a positional displacement of the head occurs between the servo areas, the magnetic head can preferably recognize that it has moved over a different track from the adjacent track.

With the technology disclosed in the JP-A-97770/1998, for example, since the parity bit is formed in a servo area, it may not be possible to know the position information between the servo areas. Therefore, with the technology disclosed in the JP-A-97770/1998, it may not be possible to reliably generate a write halt signal in high speed, high density application using the conventional techniques.

In the micro-servo area, besides for the track parity information, information for ensuring the recognition of being the micro-servo area is also preferably recorded. For example, the same signal pattern as the address mark in the servo area may be recorded. However, a different signal pattern from the servo address mark field in the servo area is preferably recorded in the address mark field in the micro-servo area in order to avoid confusion between these two areas.

Further, with the magnetic hard disk drive of the present invention, prior to the write operation to the target sector block, the corresponding track position information is preferably checked. Then, whether the recording operation to the target sector block is permitted or aborted is determined. At this step, if the recording operation is aborted, a retry operation and the determination by check of the track position information are repeated.

Alternatively or additionally, an acceleration sensor may be provided therein, so that the recording operation to the target sector block is permitted only if both the condition that the output value from the acceleration sensor is smaller than a prescribed value and the condition for determination of the track position information are satisfied.

These and other objects, features and advantages of at least some embodiments of the present invention will appear more fully from the following detailed description of the invention, the drawings, and the attached claims.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

[First Exemplary Embodiment]

Figure 1:
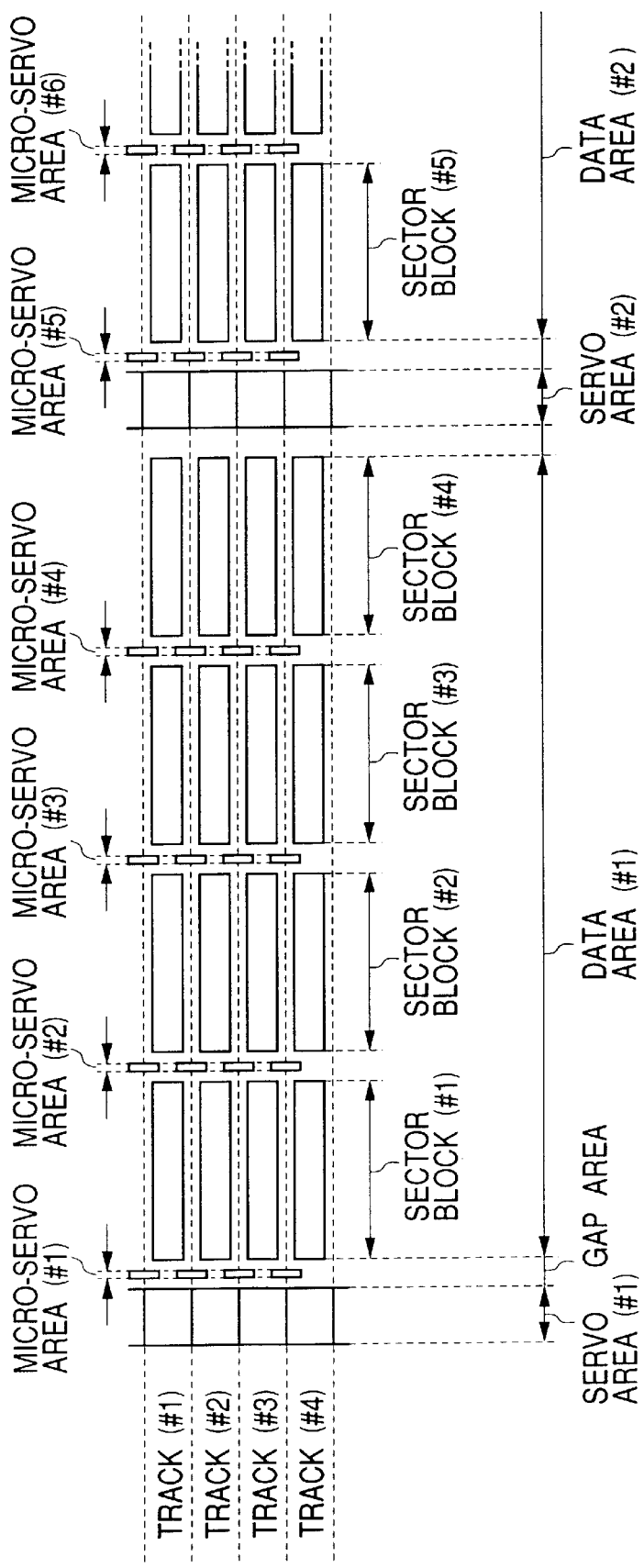
FIG. 1 illustrates the arrangement of micro-servo areas, servo areas, and data areas of the present invention.

FIG. 1 shows an example of a configuration of micro-servo areas according to at least one preferred embodiment of the present invention. The crosswise direction of the diagram corresponds to the direction around the circumference of a disk, and the vertical direction of the diagram corresponds to the radial direction of the disk. A head is fixed on a rotary actuator, while the disk is rotating at a speed of from approximately 6 to 50 m/sec from the right to the left of the diagram. This state is relatively identical to the state in which the head is moving over the disk from left to right of the diagram. Since this description is easier to understand, the following description describes the head moving over the disk, but the typical case of the disk moving underneath the head is also assumed.

FIG. 1 shows the configuration of a section covering 4 tracks, from track (#1) to track (#4), in each of which a data area (#1) is placed between a servo area (#1) and a servo area (#2). In this example, four sector blocks, from sector block (#1) to sector block (#4), are present in the data area (#1). However, since not less than ten thousand tracks and from 50 to 100 servo areas are typically present in an actual magnetic hard disk drive, this diagram is shown on a vertically enlarged scale.

Figure 9A:
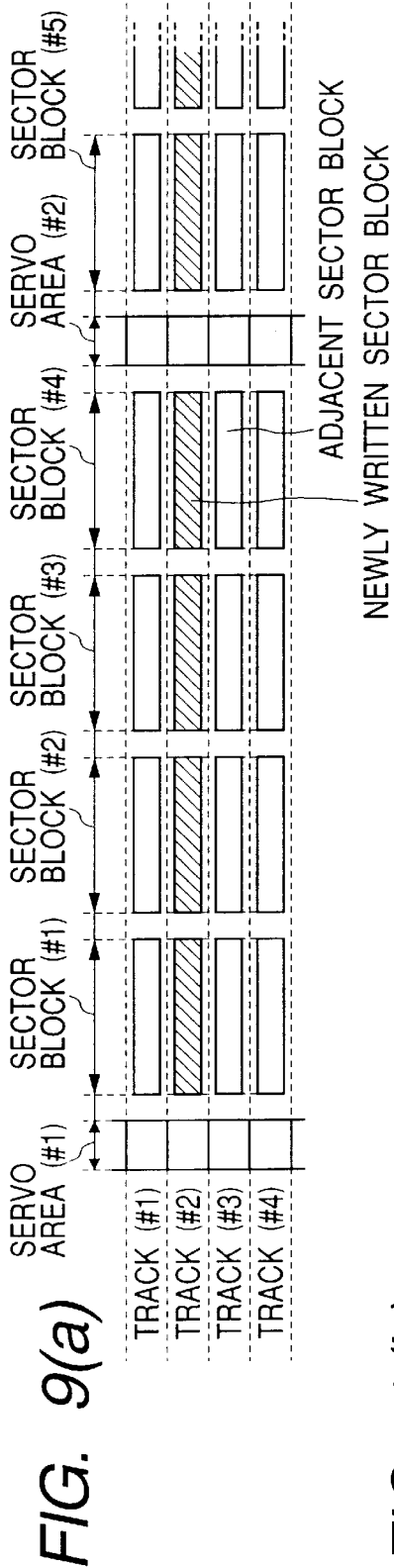
FIG. 9(a) illustrates a normal recording operation in a conventional magnetic hard disk drive and FIGS. 9(b) and 9(c) illustrate examples in which the data on an adjacent track has been corrupted by overwriting in the conventional magnetic hard disk drive.
Figure 9B:
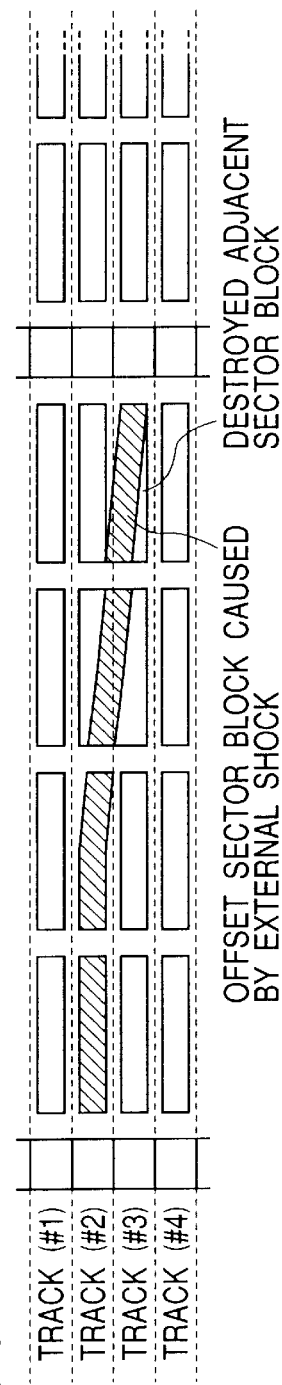
Figure 9C:
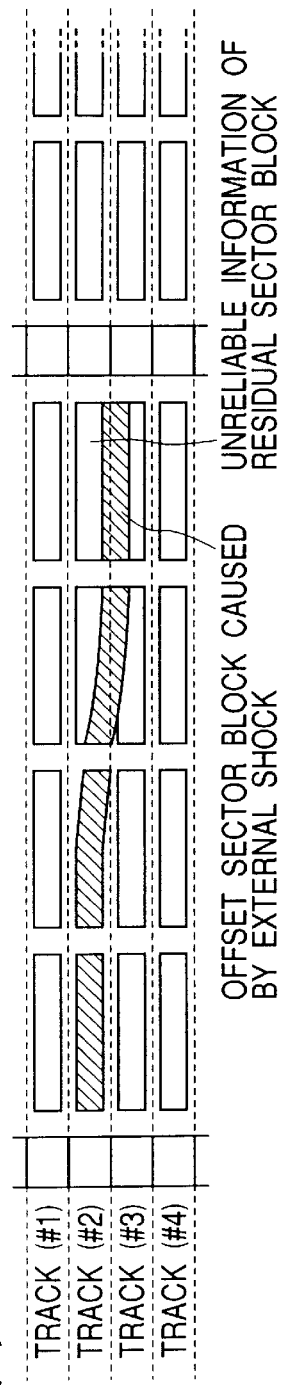

The configuration described herein is almost the same as the configuration of the servo areas and the data areas described by reference to FIGS. 9(a) to 9(c) in the preceding background section. In the magnetic hard disk drive of the present invention, there are preferably provided equal numbers of sector blocks and micro-servo areas (although a fewer number of micro-servo blocks could be used). Each respective set of equally numbered servo areas and sector blocks correspond to each other. Further, each micro-servo area is preferably formed immediately at the front of its corresponding sector block and at a position displaced in the direction of track width.

The distance of displacement in the direction of track width will now be described. In a magnetic hard disk drive using a rotary actuator, there is a so-called "yaw angle" at which the magnetic head is tilted toward the track. Since a reproducing element (read head) and a recording element (write head) are separated from each other by a constant distance (dictated by the structure of the head), it is not possible to position the recording element and the reproducing element at the center of the sector block in the data sector at the same time. Namely, there occurs a constant offset amount between the reproducing element and the recording medium. Therefore, the radial position of the head is adjusted (by the offset amount) between the times when writing on and reading from the same sector block are performed.

Figure 8:
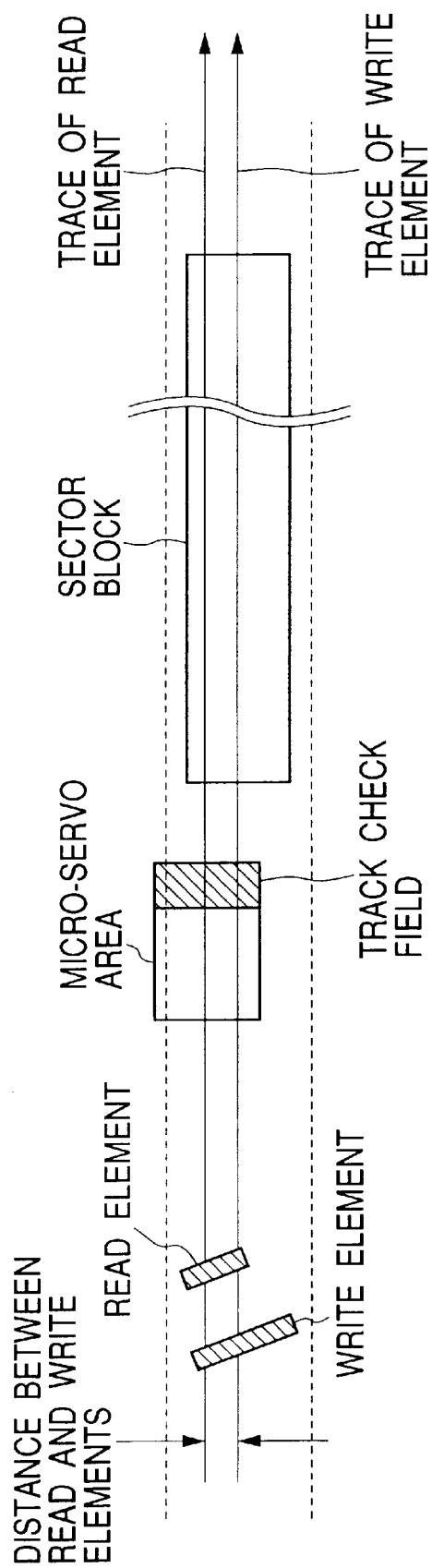
FIG. 8 illustrates the relationship between the arrangement of the micro-servo area and the data area, and the reproducing/recording element offset amount.

FIG. 8 shows the relationship between the arrangement of the micro-servo area and the sector block, and the arrangement of the recording element and the reproducing element of the head. The micro-servo area is formed so that the center line of the micro-servo area deviates from the center line of the sector block by the offset amount between the reproducing element and the recording element so as to ensure passage of the reproducing element (read head) through the center of the micro-servo area.

The offset amount varies according to the magnitude of the yaw angle. However, the maximum value of the yaw angle is determined by the specifications of the drive. Therefore, the offset amount has an upper limit, and the micro-servo area may be formed by being displaced in accordance with the maximum value of the offset amount. Consequently, it is possible to read the track information included in the micro-servo area immediately before performing a record (write) function on the sector block.

Figure 2:
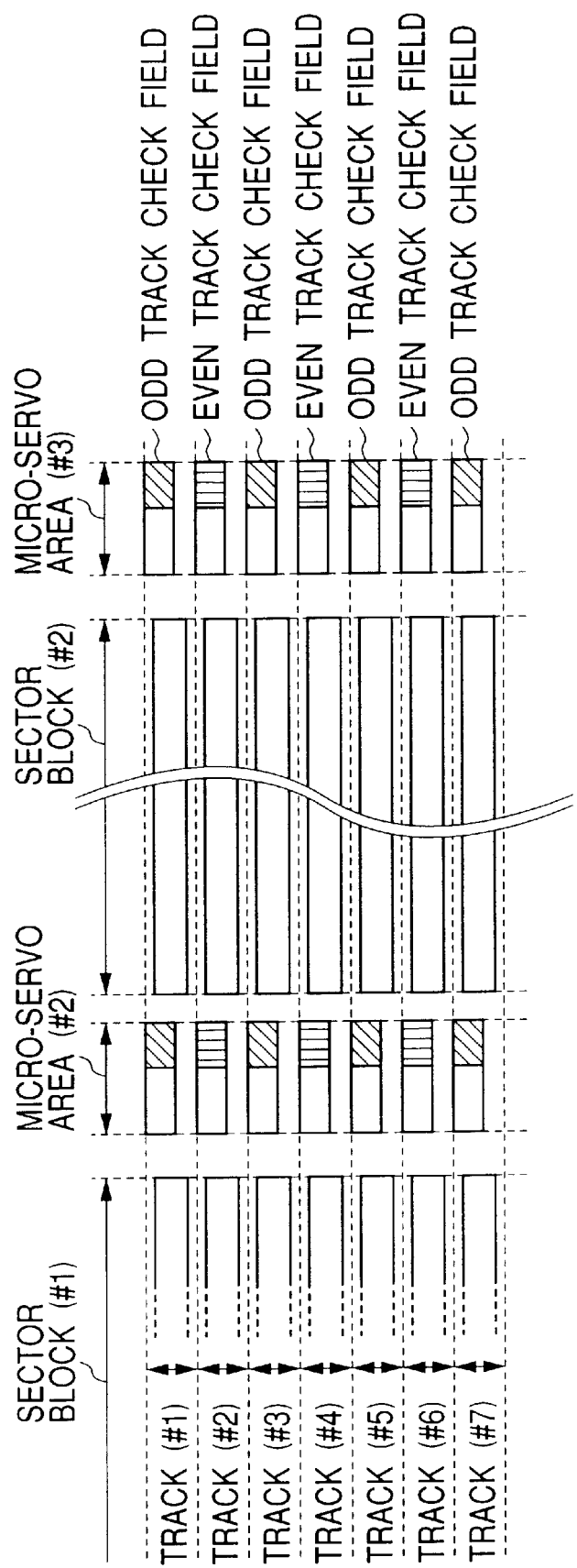
FIG. 2 illustrates the relationship between a track check code field in each micro-servo area and a track number of the present invention.

The track position information included in the micro-servo area will now be described with reference to FIG. 2, wherein the arrangement of the micro-servo areas and the sector blocks belonging to the track (#1) to the track (#7) is shown. The micro-servo areas respectively include track check code fields, wherein different codes are used depending upon whether the number of track to which the following sector block belongs is even or odd. When writing on a sector block is performed by the recording element, it is possible to judge whether the recording element is properly positioned at the center of the sector block based on whether the track check code field has been properly reproduced (read) by the reproducing element.

Particularly, in the present invention, different track check codes are used in adjacent tracks. Therefore, it is possible to detect not only a slight positional displacement from the track center but also the positional displacement of the head when the head has been displaced to the adjacent track center with reliability. This functionality may prevent the occurrence of a fatal error caused by overwriting the adjacent tracks when a positional displacement of the head occurs during recording on the data block. Consequently, it may be possible to enhance the safety against a shock during operation of the drive. Since the magnetic hard disk drive using the foregoing technology is resistant to an external shock, it may be particularly effective for being mounted in a portable apparatus.

Because the residual vibration of a servo track writer device is fixed as an error component of the head position signal when the servo area is formed, discontinuous jumps may be included in the head position signal. The micro-servo code of the present invention can reduce the influences of the discontinuous components of the head position signal. Therefore, it may be possible to markedly reduce the probability of an erroneous write inhibit signal occurring, i.e., an abort instruction of the recording operation. Consequently, it is possible to implement a magnetic hard disk drive with a higher track density.

Further, conventional magnetic hard disk drives typically have an undesirably low accuracy of timing at which writing on the sector block is started. Accordingly, there occurs an error of several bits at a position in the bit direction of the sector block of the adjacent track. In the present invention, the timing of starting the writing to the sector block can be determined from the micro-servo area. Consequently, it may be possible to reduce errors in the down-track direction and enhance the format efficiency of the disk.

Figure 11:
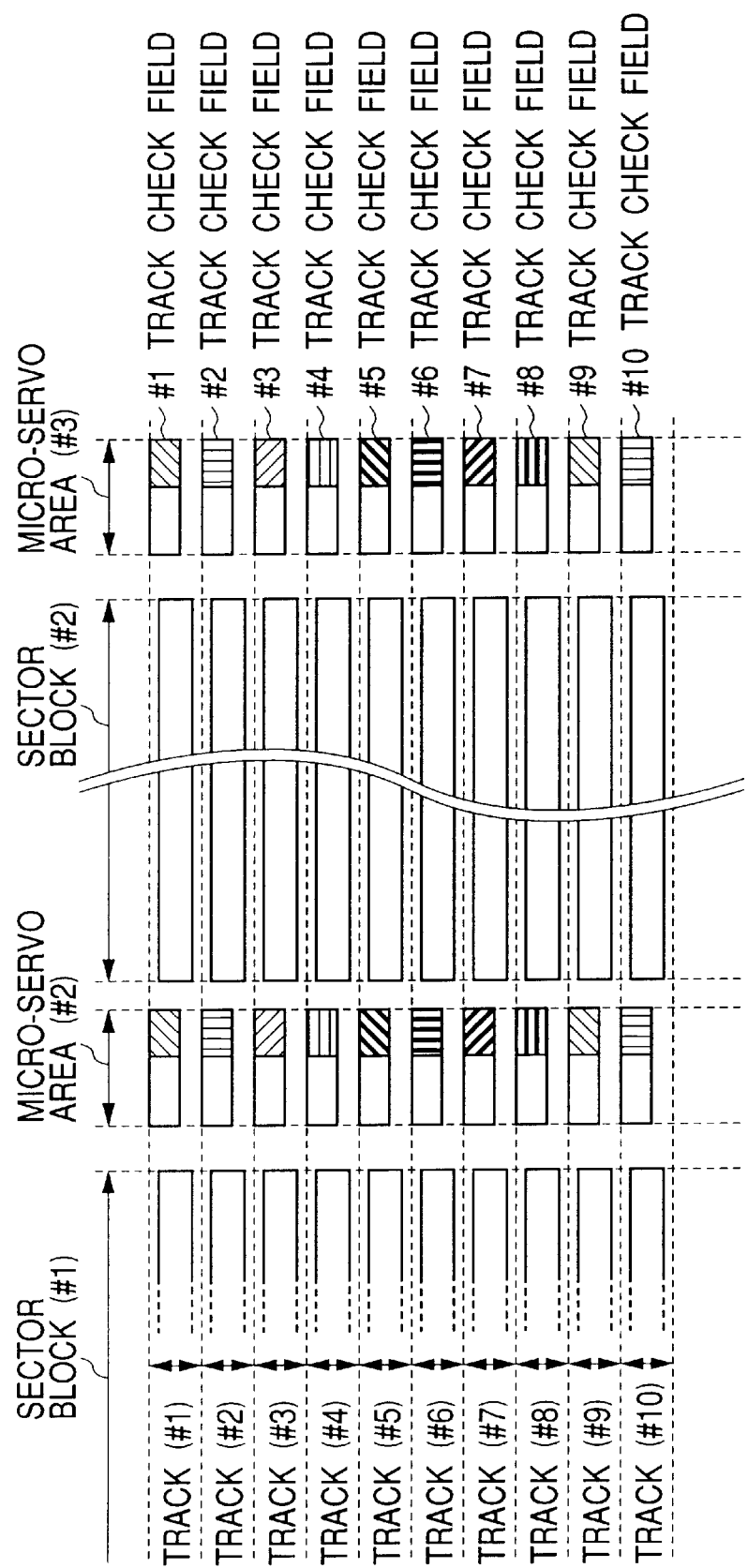
FIG. 11 illustrates the relationship between a track check code field in each micro-servo area and a track number of the present invention.

With the forgoing technology, the track parity information preferably repeats every two tracks (alternating the parity bit). However, when the head is displaced to a second adjacent track (or some other multiple of two), there is a possibility of misjudging that the head is positioned at a proper track (because the parity bit will be the same). For this reason, it is also possible to detect the positional displacement in a wider range of cases by individually allocating a larger number of different types of track parity information to every track (i.e., more than 2 parity states). FIG. 11 shows an example in which 8 types of track parity codes are used and are allocated to their respective tracks repeatedly for every 8 tracks. However, if too many different track check codes are used, the amount of information included in the micro-servo area is undesirably increased, which may result in a reduction in the formatted capacity of the drive.

For example, for a drive in which a disk has 360 sector blocks per circumference and is to be rotated at 4200 RPM, the time interval of the micro-servo area is approximately 0.04 millisecond. When an impact force of 1000 G is applied, the head displacement during this period is calculated to be approximately 7.8 $\mu$m. In a current magnetic hard disk drive, the track pitch is from no more than approximately 1 $\mu$m. However, for example, for a drive having a track pitch of 0.5 $\mu$m, the number of tracks by which the head is displaced due to a 7.8 $\mu$m positional displacement is 15.6. Accordingly, there is a low possibility that the positional displacement of more than 16 tracks occurs. Therefore, in the present invention, by using from 2 to 16 types of track parity information, it is possible to implement both the reliable performance of detecting the positional displacement of the head and a high format efficiency. The 16 types of track information can be expressed by a minimum of 4 ($4^2$=16).

The number of bits of the track parity information is desired to be as small as possible from the viewpoints of avoidance of misdetection and format efficiency. Accordingly, the track parity information preferably has a data size of no more than 4 bits. The data size of the signal pattern recorded in the servo area is approximately 100 bits. Thus, for information having a data size of approximately 4 bits, the size of the data area is not compressed even if the information is recorded between the data sectors.

Figure 3:
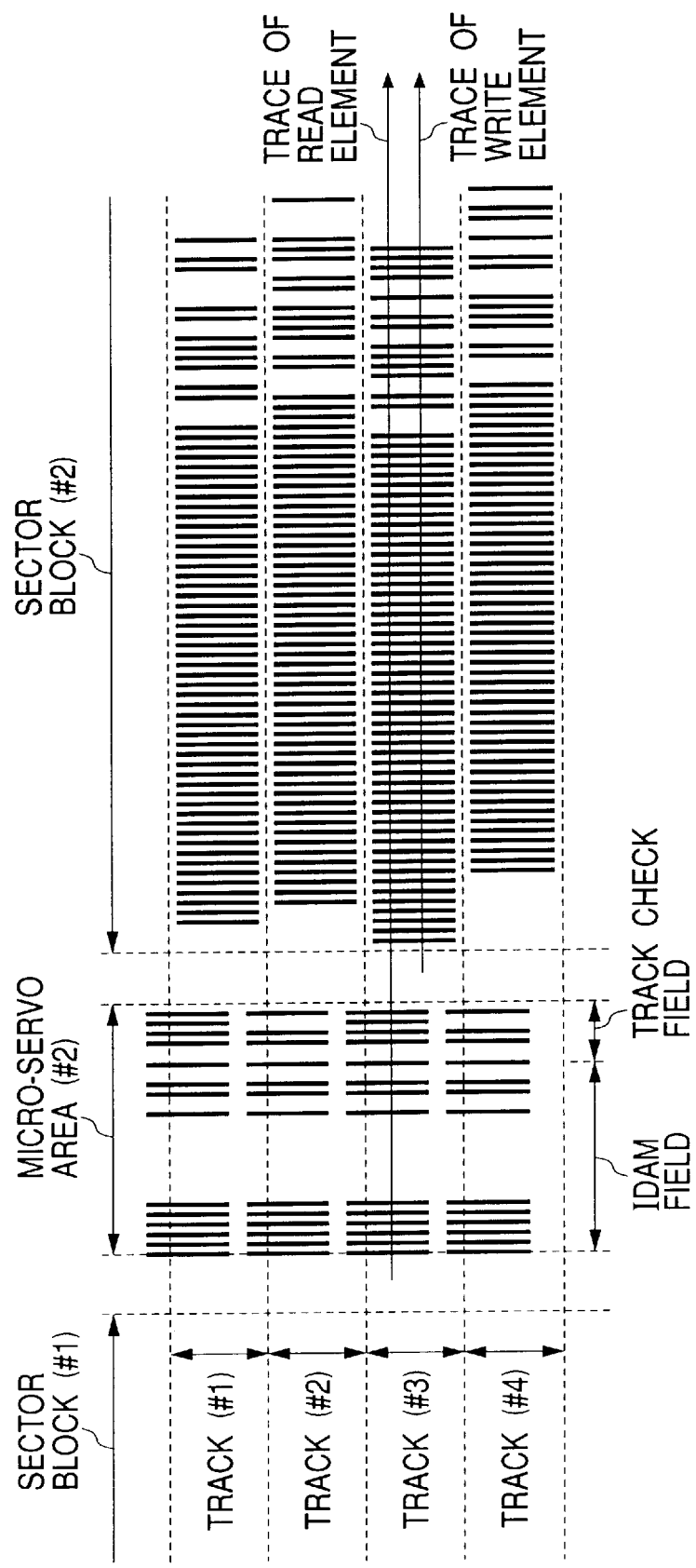
FIG. 3 shows an example of each signal pattern recorded in the micro-servo area of the present invention.

Further, the bit information included in the micro-servo area will be described in detail with reference to FIG. 3. FIG. 3 shows one example of the bit information on the micro-servo areas and the sector blocks belonging to the tracks (#1) through (#4). The micro-servo area is preferably made up of an identification address mark (IDAM) field and a track parity check code field. In the FIG. 3 example, the IDAM field is made up of a repeating pattern of 6 bits, an 8-bit DC erasing pattern, and a 6-bit specific pattern. The IDAM field is preferably shorter from the viewpoint of format efficiency.

The IDAM may be configured so that a signal pattern for extracting a synchronized clock, called a phase-locked loop (PLL), is eliminated. The signal pattern for a PLL has a data size of several tens of bits. Accordingly, if PLL is not eliminated, the data size of the IDAM field is increased, causing a compression in the size of the data area. If the data size of the track parity check field is approximately 4 bits, the signal pattern is simple. Accordingly, even if PLL is eliminated, the head can recognize the micro-servo area while moving over the track.

PLL is also recorded in the servo area. Therefore, if PLL can be eliminated, the servo information can also be reduced in data size. However, since the signal pattern recorded in the servo area is complicated, PLL is generally necessary in order for the head to recognize the servo area while moving over the track. Therefore, it may not be practical to eliminate PLL from the servo area.

The micro-servo area is preferably formed with the same bit frequency as that of the servo area. Additionally, the pattern of the IDAM field is preferably made different from the pattern of the servo address mark (SVAM) field of the servo area so that the drive can avoid any confusion with the servo area. FIG. 3 shows an example in which the track check code field is made up of 1 bit of track parity information and bits of redundant information. By designing the pattern of the micro-servo area in this way, it becomes possible to use almost the same circuit as that for the detection of the servo area. Consequently, a disk drive capable of detecting the micro-servo area may be easier to design and manufacture than if the micro-servo area was designed differently.

Further, as a method for enhancing the format efficiency, the number of micro-servo areas may be made smaller than the number of the sector blocks. For example, as for the micro-servo area corresponding to the sector block immediately succeeding the servo area, its function can be substituted by the function of the servo area. Accordingly, it is possible to eliminate the micro-servo area immediately succeeding the servo area. Similarly, the micro-servo areas corresponding to some sector blocks can be eliminated so long as the required accuracy of detecting the positional displacement of the head is maintained, thereby enhancing the format efficiency. For example, with such a configuration that a micro-servo area is arranged for every two sector blocks, it is possible to further enhance the format efficiency.

The signal pattern of the micro-servo area is preferably written by means of a device called a servo track writer simultaneously with the servo area because a high accuracy is required. Consequently, it may be possible to accurately form the inner circumference through outer circumference of the disk with the same frequency as that of the servo area. Further, the servo track writer has the functionality to externally accurately determine the head position and the functionality to generate a clock signal in synchronism with the rotational angle of the disk. Therefore, it can accurately record the position in the track direction or in the bit direction of the signal pattern to be recorded in the micro-servo area. The starting points in the direction of track length of the signal patterns thus recorded are mutually aligned between adjacent tracks. Thus, even when the head moves in the direction of track width and obliquely crosses the micro-servo area, it may be possible to accurately detect the position information of the track.

By forming the micro-servo area with a bit frequency of 1.5 times or twice as high as the frequency of the servo area, it may be possible to further enhance the format efficiency. However, if the frequency is changed, more time is required for pattern formation, so that the throughput in the manufacturing of the drive may be reduced.

[Second Exemplary Embodiment]

Figure 4:
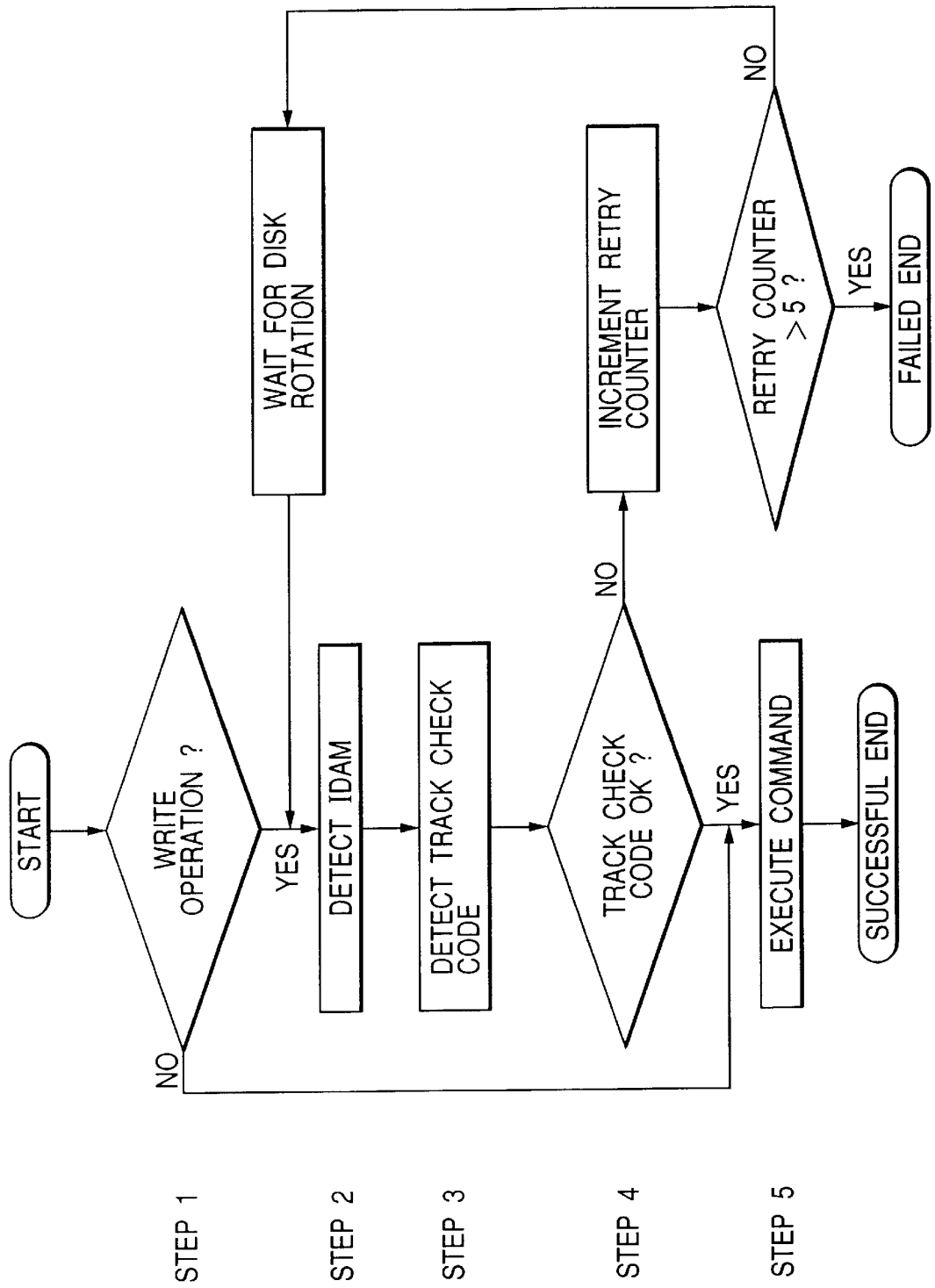
FIG. 4 is a flowchart showing one exemplary process for determining whether a recording operation is permitted by using a track check code according to the present invention.

FIG. 4 is a flowchart for illustrating the process of controlling the execution of the read and write operations to the data block by using the micro-servo area of the present invention. In Step 1, a determination is made as to whether the host side request is a read instruction or a write instruction. If the request is a read instruction, the process preferably skips Step 5 where the read instruction is executed. Thereafter, the process shifts to the procedure of normal termination.

If the request is a write instruction, the process advances to Step 2 where a controller waits for the detection of IDAM in the micro-servo area. The IDAM denotes the time to start the track check code included in the micro-servo area. When the detection of IDAM is confirmed, the detection of the track check code is subsequently performed in Step 3. In Step 4, a determination is made as to whether the detected track check code matches the code of the track to which the sector block to be written belongs. If a match between the codes is confirmed, the process advances to Step 5, where the write instruction to the sector block is executed. Then, the process shifts to the procedure of normal termination.

However, if a match between the codes cannot be confirmed, the numerical value of a counter for counting the number of retries is incremented. If the result of the increment is not more than 5 (or some other preset maximum retry number), the detection of IDAM of Step 2 is performed again after waiting for the disk to rotate until the target sector block arrives. If the number of retries is more than the preset maximum, the process preferably shifts to the procedure of an error termination processing of transferring the fact that the write operation has not been terminated normally to the host side.

By detecting the IDAM and the track check code included in the micro-servo area only for the write processing instruction in this manner, it is possible to confirm that the recording element of the head is properly positioned at the target sector block. By detecting a slight positional displacement of the head from the sector block with reliability, it is possible to avoid the fatal error of overwriting the adjacent tracks and to implement increased safety against data loss because of a shock during operation of the drive.

For the read processing instruction, the micro-servo area is so positioned as to be displaced from the center line of the reproducing element of the head in order to position the reproducing element at the target sector block. In this state, it is difficult to obtain a reproduced signal with a sufficient amplitude, and there is a high possibility that an interrupt of a disk rotation wait step due to a retry processing frequently occurs. Therefore, by not performing detection of the IDAM and the track check code during a read processing instruction, it is preferably possible to implement a high performance characteristic.

Figure 5:
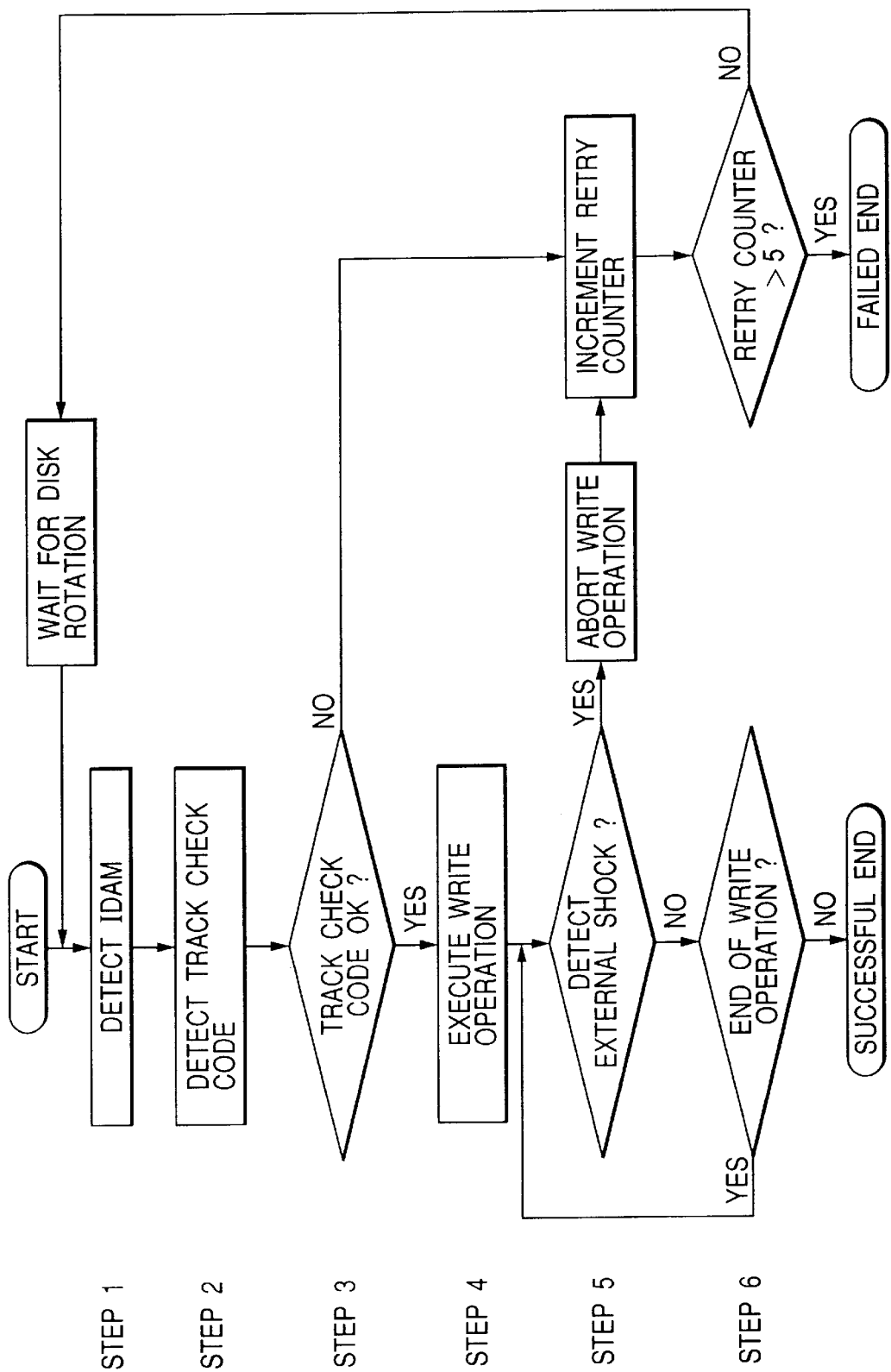
FIG. 5 is a flowchart showing one exemplary process for determining whether a recording operation is permitted based on the track check code and the output from an acceleration sensor.
Figure 6:
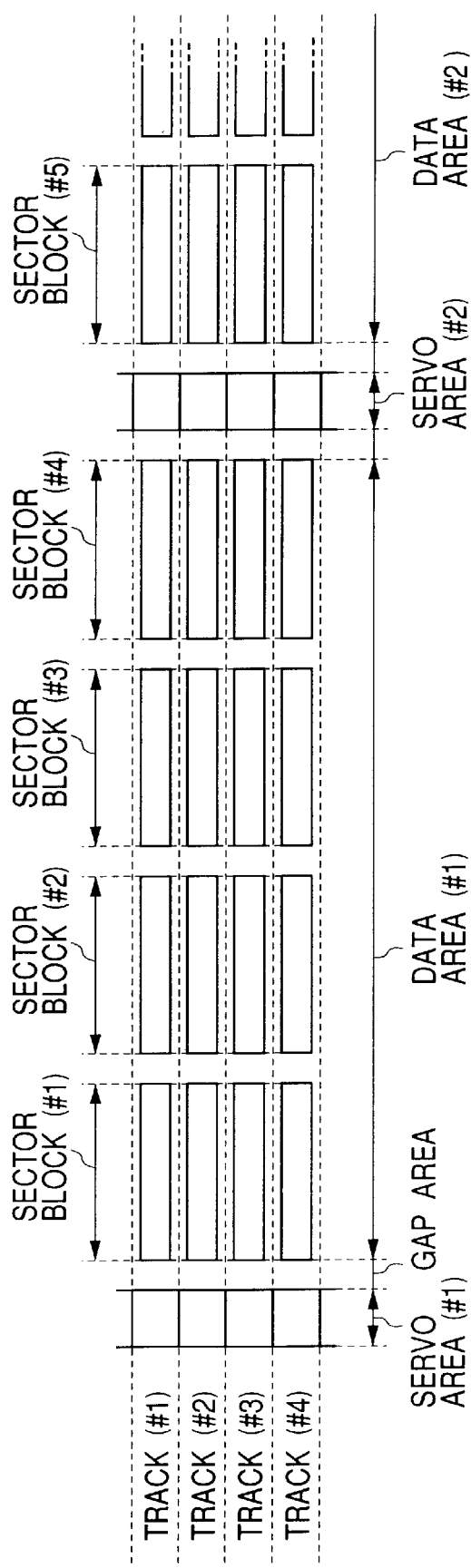
FIG. 6 illustrates the arrangement of servo areas and data areas of a conventional magnetic hard disk drive.
Figure 7:
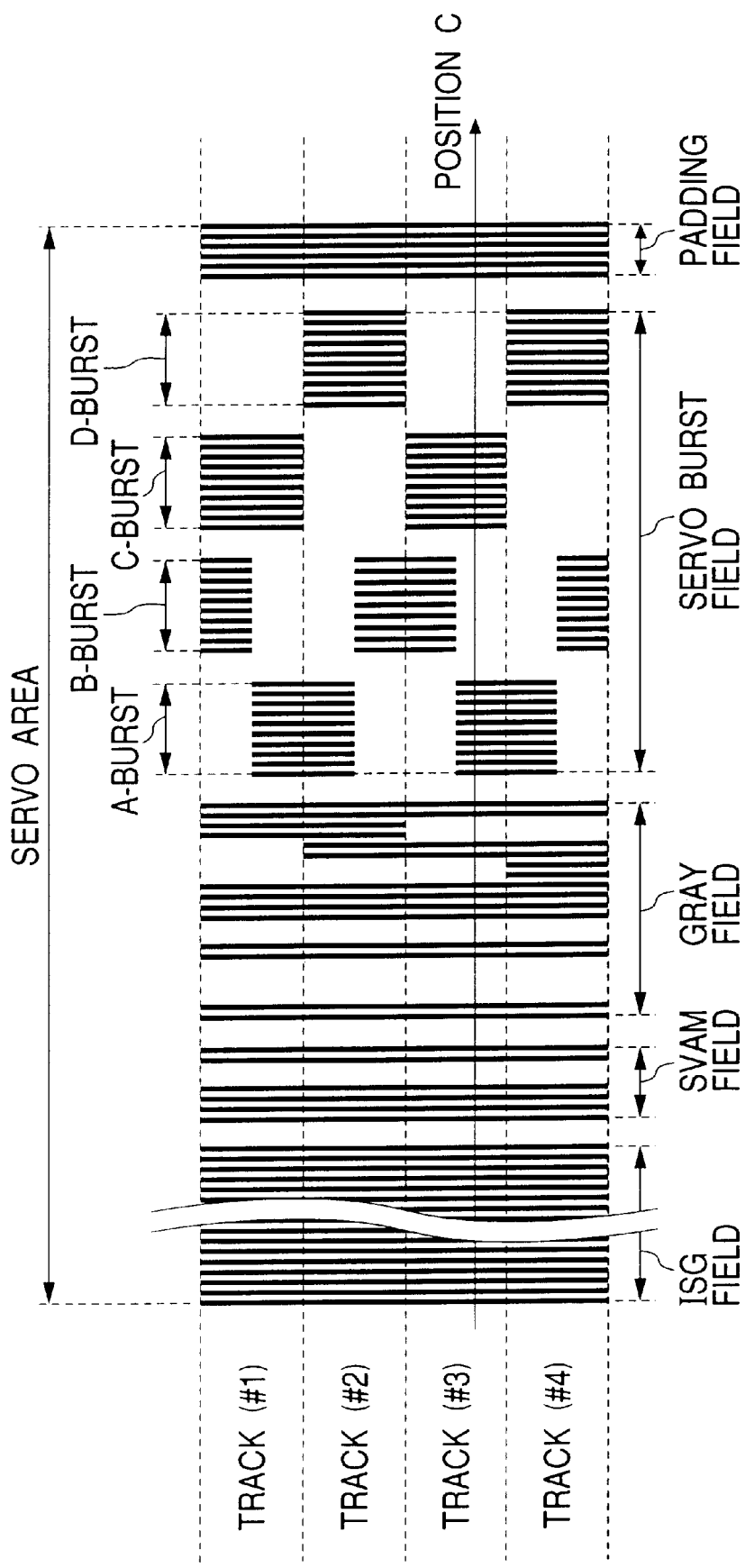
FIG. 7 illustrates an exemplary configuration of conventional servo patterns.

According to the present invention, there is preferably provided a magnetic hard disk drive with performance characteristics particularly adaptable to use for a portable apparatus. FIG. 5 is a flowchart for illustrating a control process for further enhancing the safety against an external shock by using the micro-servo area and an acceleration sensor of the present invention in combination. The steps of the detection of the IDAM and the track check code and the determination of a match described in from Step 1 through Step 3 are performed in the same manner as with the steps described in FIG. 4. After beginning the write operation in Step 4, detection of the output value from the acceleration sensor is constantly performed during the write operation in Step 5 through Step 6. If the output value from the acceleration sensor becomes larger than a predetermined maximum value, it is determined that some shock has been externally applied to the disk and the write operation is preferably aborted.

The micro-servo area can detect an external shock with high accuracy as described above. However, since it is arranged between the sector blocks, the micro-servo area can detect the external shock only at a constant time interval. Therefore, when a very large external shock is applied to the disk, the head may undergo a positional displacement to the adjacent track before detecting the positional displacement of the head in the next micro-servo area. By using the micro-servo area for the detection of a small external shock and further using the acceleration sensor for the detection of a large external shock, it may be possible to detect the positional displacement of the head due to the external shocks in various modes with high repeatability.

The process of repeating a retry a preset number of times upon aborting the write operation in Step 5 is also the same processing in the step described with respect to FIG. 4. In the present example, the maximum number of retries is shown as 5, but other values may be used.

[Third Exemplary Embodiment]

Figure 10:
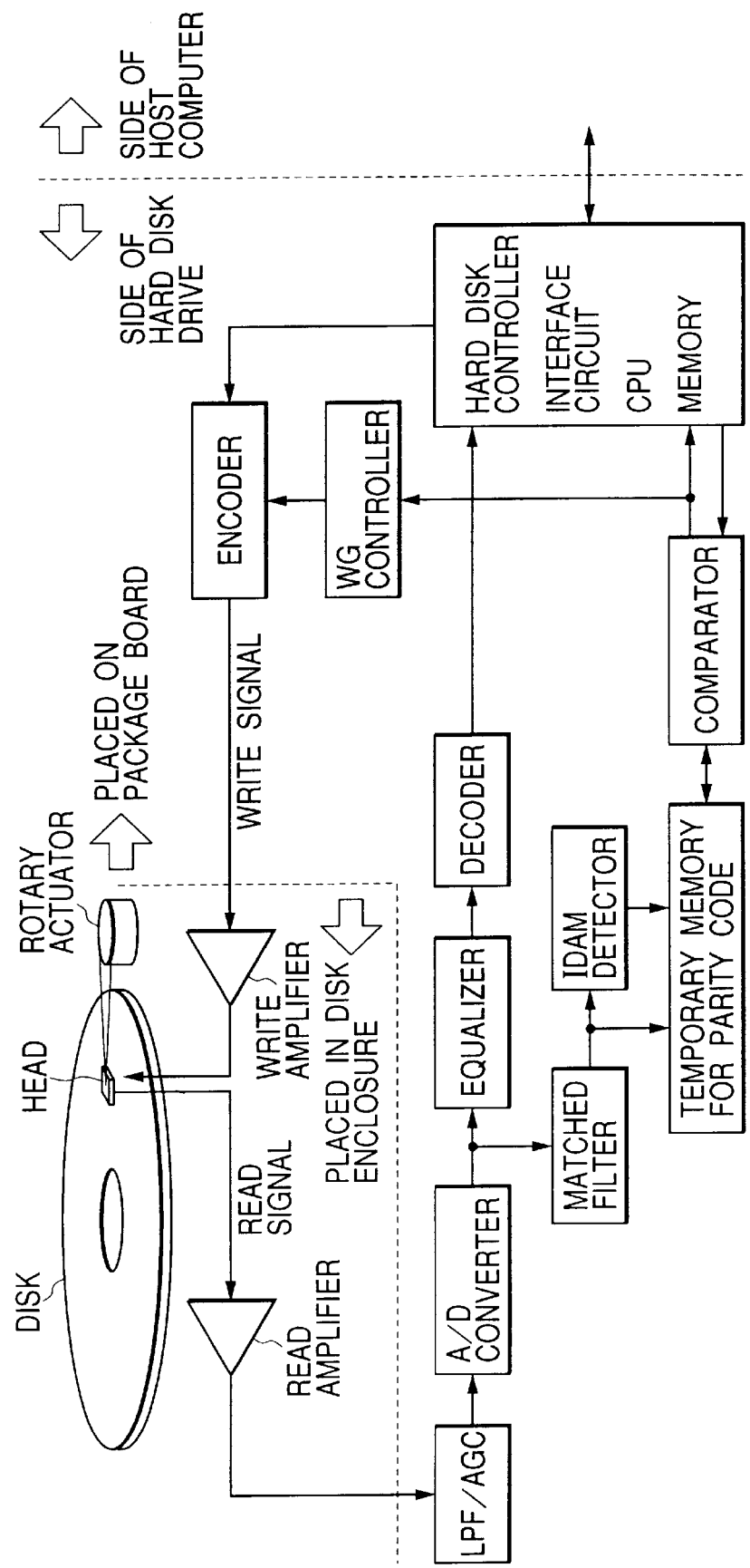
FIG. 10 is a block diagram for illustrating an example of a circuit for detecting the micro-servo area.

FIG. 10 is a block diagram showing an example of a configuration of a circuit for detecting the track parity code from the micro-servo area of the present invention and for controlling a write gate signal. Initially, the reading of disk information will be described. The reproduced signal of the head is amplified by about 100 to 200 times by a head amplifier, and the amplified signal is then input into a data processing circuit having an equalizer and a decoder. In the example shown in FIG. 10, the circuit system preferably includes: a low pass filter (LPF); an auto gain controller (AGC); an analog/digital (A/D) converter; an equalizer; a decoder; a matched filter; an identification address mark (IDAM) detector; a temporary memory for a parity code; a comparator; a write gate (WG) controller; and an encoder. This circuit system generally provides the processing of the recorded/reproduced signals of the magnetic head, and it may also include other circuit elements than the ones described above.

A high frequency noise component of the reproduced signal input from the head is suppressed by the low pass filter (LPF), and the amplitude of the signal is adjusted to a constant level by the auto gain controller (AGC). The reproduced signals are sequentially converted into digital values by the A/D converter and are converted into the original user data by the equalizer and the decoder. A hard disk controller (HDC) controls the timing of the operation of each of the circuit elements. The converted user data is transferred to the host computer through an interface circuit. The configuration described above is similar to that of a conventional magnetic hard disk drive.

The magnetic hard disk drive of the present invention preferably comprises a means for detecting the micro-servo area and for checking the track parity code included therein. The reproduced signal from the micro-servo area, which has been converted into a digital value by the A/D converter, is subjected to data formatting by the matched filter. The starting position of the track parity code included in the micro-servo area is detected from the data string by the IDAM (identification address mark) detector. By using a circuit having the same configuration as that of a conventional servo decoding circuit for the matched filter and the IDAM detector, it is possible to implement a circuit for checking the track parity code.

The temporary memory for a track parity code is controlled at the timing at which the IDAM detector has detected an IDAM, so that the track parity code following the IDAM is temporarily stored therein. The comparator then determines whether the stored contents and the parity code of the previously prepared target track are matched with each other. Based on the results of this comparison, the write gate controller ("WG controller") makes a WG signal active, to control the timing of starting the writing function. If the results of the controller are not matched, the WG signal is kept in the negative state, and the HDC preferably shifts to the retry processing involving disk rotation waiting.

Through the use of this circuit configuration, by detecting the micro-servo area prior to the write operation, it may be possible to determine whether the head is properly positioned at the sector block. It is therefore possible to avoid a fatal error of overwriting of the adjacent tracks which may greatly enhance the safety against a shock during the operation of the device.

With a conventional magnetic hard disk drive, the timing of starting the recording to the sector block is determined from the servo area. Therefore, the more distant the sector block is from the servo area, the larger the displacement between the top position of the sector block and the starting position of the recording operation. For this reason, a margin area is required for absorbing the error of the starting point. With the circuit configuration of preferred embodiments of the present invention, by determining the timing of starting of the writing to the sector block based on the output from the comparator, it may be possible to determine the position of starting the recording operation to the sector block from the micro-servo area. Accordingly, it is possible to keep the error of the position of starting the recording operation to a minimum as compared with the conventional method based on the servo area. Consequently, it is possible to reduce the margin area between the sector blocks, thereby increasing the format efficiency and improving the memory capacity of the drive.

According to the present invention, even in a state where the head is positioned in an area between the servo areas, it may be possible to detect a positional displacement of the head due to an external shock with high accuracy and reliability. It is therefore possible to markedly reduce the risk of corrupting the adjacent data track by offset writing. Consequently, it is possible to implement a magnetic hard disk drive having an improved shock resistance performance during operation.

Further, it is possible to reduce the influence of the error of the head position signal caused by mechanical vibrations of the servo track writer apparatus. Accordingly, it is possible to reduce the probability of an erroneous write inhibit signal occurring. Consequently, it is possible to implement a magnetic hard disk drive having a high track density and a large capacity.

By achieving a higher accuracy of the timing of starting of the writing to the data sector, it is possible to enhance the format efficiency. Consequently, it is possible to implement a large-capacity magnetic hard disk drive.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A magnetic hard disk drive, comprising:
   a magnetic hard disk comprising data areas divided into a plurality of sector blocks and at least one micro-servo area formed between at least two of said plurality of sector blocks, each micro-servo area including a parity code of a track number recorded therein;
   a magnetic head comprising a reproducing element for converting magnetic information recorded on the magnetic hard disk into an electric signal and a recording element; and a data processing circuit for processing magnetic information input or output from the magnetic head, wherein the data processing circuit comprises a means for detecting the parity code recorded in the micro-servo area.

2. The magnetic hard disk drive according to claim 1, wherein said magnetic disk further comprises servo areas each including servo information recorded therein, wherein said data areas each are formed between the servo areas, further wherein said micro-servo areas have a smaller area than said servo areas, and further wherein said parity code recorded in said micro-servo areas has a smaller data size than that of the servo information.

3. The magnetic hard disk drive according to claim 2, wherein there is a micro-servo area immediately before each of said plurality of sector blocks.

4. The magnetic hard disk drive according to claim 3, wherein an address mark and a track parity check code are recorded in the micro-servo area.

5. The magnetic hard disk drive according to claim 1, wherein the center line in the track direction of the micro-servo area is distant from the center line in the track direction of the sector block by a distance amount corresponding to the distance in the direction of track width between the recording element and the reproducing element.

6. The magnetic hard disk drive according to claim 4, wherein a track parity check code corresponding to a certain data area is different from a second track parity check code corresponding to a data area in at least one adjacent track.

7. The magnetic hard disk drive according to claim 6, wherein there are between 2 and 16 types of track parity check codes.

8. The magnetic hard disk drive according to claim 6, wherein the track parity check code has a data size of not more than 4 bits.

9. The magnetic hard disk drive according to claim 4, wherein in a first micro-servo area corresponding to a first data sector block and a second micro-servo area corresponding to a second data sector block adjacent in the direction of track width to the first data sector block, the starting points of the signal patterns representing their respective address marks or track parity check codes are aligned in the direction of track width.

10. The magnetic hard disk drive according to claim 4, wherein the servo area has an address mark field, and the signal pattern recorded in the address mark field of the micro-servo area is different from the signal pattern recorded in the address mark field of the servo area.

11. The magnetic hard disk drive according to claim 4, wherein the bit frequency of the micro-servo information signal pattern is the same as the bit frequency of the signal pattern recorded in the servo area.

12. The magnetic hard disk drive according to claim 1, further including an acceleration sensor.

13. A magnetic hard disk drive, comprising:
a magnetic hard disk having servo areas each including servo information recorded therein, data areas each formed between the servo areas and divided into a plurality of sector blocks, and micro-servo areas each formed between the plurality of the sector blocks and each having a smaller area than that of the servo area, wherein each micro-servo area includes track position information recorded therein having a smaller data size than that of the servo information;
a magnetic head having a reproducing element for converting magnetic information recorded on the magnetic hard disk into an electric signal and a recording element; and
a data processing circuit for processing magnetic information input or output from the magnetic head, wherein the data processing circuit identifies the track position information recorded in the micro-servo area corresponding to the sector block to which a recording operation is to be performed and allows the magnetic head to perform said recording operation if the track position information matches the track position information corresponding to the sector block to which the recording operation is performed at the time of the recording operation to the sector block.

14. The magnetic hard disk drive according to claim 13, wherein the data processing circuit aborts the recording operation of the magnetic head if the track position information does not match the track position information corresponding to the target sector block.

15. The magnetic hard disk drive according to claim 13, further comprising:
an acceleration sensor for detecting an external shock, wherein the data processing circuit allows the magnetic head to perform the recording operation only if the value of the acceleration detected by the acceleration sensor is smaller than a prescribed value determined by the specifications of the drive, and the track position information matches the track position information of the track to which the sector block to which the recording operation is performed belongs.

16. The magnetic hard disk drive according to claim 13, wherein if the track position information does not match the track position information of the track to which the target sector block belongs, the data processing circuit retries the recording operation up to a maximum number of times prescribed by the specifications of the drive.

17. The magnetic hard disk drive according to claim 13, further comprising a write gate controller for generating a write gate signal which determines the timing of starting the recording to the sector block, wherein the write gate controller makes the write gate signal active if the track position information matches the track position information of the track to which the target sector block belongs.

18. A magnetic disk medium for a magnetic hard disk drive, comprising:
a plurality of servo areas each including servo information recorded therein;
a plurality of data areas each formed between the servo areas and divided into a plurality of sector blocks; and
micro-servo areas each formed between the plurality of sector blocks and each having a smaller area than that of the servo area, wherein each micro-servo area includes a parity code of a track number recorded therein having a smaller data size than that of the servo information.

19. The magnetic disk medium according to claim 18, wherein an address mark and a track parity code are recorded in the micro-servo area.

20. The magnetic disk medium according to claim 19, wherein there are between 2 and 16 types of track parity check codes.

* * * * *